(12) United States Patent
Chiosi et al.

(10) Patent No.: US 11,630,646 B2
(45) Date of Patent: Apr. 18, 2023

(54) SOFTWARE DEFINED NETWORK CONTROLLER

(71) Applicant: Atlassian Inc., San Francisco, CA (US)

(72) Inventors: Margaret Chiosi, East Brunswick, NJ (US); Brian Dean Freeman, Farmingdale, NJ (US); Han Nguyen, Marlboro, NJ (US)

(73) Assignee: ATLASSIAN US, INC., San Francisco, CA (US)

( * ) Notice: Subject to any disclaimer, the term of this patent is extended or adjusted under 35 U.S.C. 154(b) by 211 days.

(21) Appl. No.: 15/930,976

(22) Filed: May 13, 2020

(65) Prior Publication Data

US 2020/0272431 A1     Aug. 27, 2020

Related U.S. Application Data

(63) Continuation of application No. 16/521,496, filed on Jul. 24, 2019, now Pat. No. 10,705,808, which is a
(Continued)

(51) Int. Cl.
| | |
|---|---|
| *H04L 12/803* | (2013.01) |
| *G06F 9/445* | (2018.01) |
| *H04L 12/715* | (2013.01) |
| *G06F 9/455* | (2018.01) |
| *G06F 8/35* | (2018.01) |
| *H04L 41/14* | (2022.01) |

(Continued)

(52) U.S. Cl.
CPC ............... *G06F 8/35* (2013.01); *G06F 8/41* (2013.01); *G06F 8/60* (2013.01); *H04L 41/0843* (2013.01); *H04L 41/145* (2013.01); *H04L 41/5048* (2013.01)

(58) Field of Classification Search
CPC ..... G06F 8/35; G06F 8/41; G06F 8/60; H04L 41/0843; H04L 41/145; H04L 41/5048
See application file for complete search history.

(56) References Cited

U.S. PATENT DOCUMENTS

| | | |
|---|---|---|
| 7,882,209 B1 | 2/2011 | Eslambolchi et al. |
| 8,521,905 B2 | 8/2013 | Beliveau et al. |
| | (Continued) | |

OTHER PUBLICATIONS

Nishimura et al., Rapid Software Image Distribution for Resource Sharing among Highly Available Session Control Server Clusters, 6 pages (Year: 2012).*

(Continued)

*Primary Examiner* — Thuy Dao
(74) *Attorney, Agent, or Firm* — Brownstein Hyatt Farber Schreck, LLP

(57) ABSTRACT

Concepts and technologies are disclosed herein for providing and using a software defined network controller. A software defined network controller can be provided by a computing system that includes a processor. A service model that represents a service can be obtained. A network model that represents network resources that support the service can be obtained. Resources that support the service can be determined. Templates can be accessed to identify templates that relate to the resources. The templates identified can be assembled to obtain a template-based representation of the service. The template-based representation can be executed to determine if the service is ready for deployment.

14 Claims, 7 Drawing Sheets

Related U.S. Application Data continuation of application No. 15/256,675, filed on Sep. 5, 2016, now Pat. No. 10,365,899, which is a continuation of application No. 14/471,534, filed on Aug. 28, 2014, now Pat. No. 9,436,443.

(51) Int. Cl.
  *H04L 41/084* (2022.01)
  *G06F 8/41* (2018.01)
  *H04L 41/5041* (2022.01)
  *G06F 8/60* (2018.01)

(56) References Cited

U.S. PATENT DOCUMENTS

| | | | |
|---|---|---|---|
| 8,677,318 | B2 | 3/2014 | Mohindra |
| 8,711,860 | B2 | 4/2014 | Beliveau et al. |
| 9,021,478 | B1 | 4/2015 | Wan |
| 9,038,068 | B2 | 5/2015 | Engle et al. |
| 9,043,786 | B1 | 5/2015 | Hodge |
| 9,177,132 | B2 | 11/2015 | Rendahl |
| 9,298,848 | B2 | 3/2016 | Cao |
| 9,444,760 | B2 | 9/2016 | Breiter et al. |
| 9,558,039 | B2 | 1/2017 | Bryant et al. |
| 9,584,439 | B2 | 2/2017 | Leafe et al. |
| 9,729,468 | B2 | 8/2017 | Jaisinghani et al. |
| 9,762,503 | B2 | 9/2017 | Weber et al. |
| 9,819,554 | B2 | 11/2017 | Varney et al. |
| 10,284,474 | B2 * | 5/2019 | Bruun ............ H04L 47/20 |
| 2007/0282581 | A1 | 12/2007 | Mangino et al. |
| 2009/0109959 | A1 | 4/2009 | Elliott et al. |
| 2010/0002722 | A1 | 1/2010 | Porat et al. |
| 2010/0110933 | A1 | 5/2010 | Wilcock et al. |
| 2010/0115490 | A1 | 5/2010 | Wilcock et al. |
| 2011/0047274 | A1 | 2/2011 | Kuo et al. |
| 2011/0060946 | A1 | 3/2011 | Gupta |
| 2011/0093490 | A1 | 4/2011 | Schindlauer et al. |
| 2011/0209140 | A1 | 8/2011 | Scheidel et al. |
| 2011/0320540 | A1 | 12/2011 | Oostlander |
| 2012/0072762 | A1 | 3/2012 | Atchison et al. |
| 2012/0166647 | A1 * | 6/2012 | Nam ............ H04L 49/65 709/226 |
| 2013/0010608 | A1 | 1/2013 | Ramachandran et al. |
| 2013/0090094 | A1 | 4/2013 | Shaw |
| 2013/0191708 | A1 | 7/2013 | Song |
| 2013/0195113 | A1 | 8/2013 | Kotha et al. |
| 2013/0259465 | A1 | 10/2013 | Blair |
| 2013/0266007 | A1 | 10/2013 | Kumbhare et al. |
| 2013/0283273 | A1 | 10/2013 | Miyazaki |
| 2013/0290543 | A1 | 10/2013 | Lochhead et al. |
| 2013/0329601 | A1 | 12/2013 | Yin et al. |
| 2014/0033268 | A1 | 1/2014 | Julisch et al. |
| 2014/0047119 | A1 | 2/2014 | Wong et al. |
| 2014/0112190 | A1 | 4/2014 | Chou et al. |
| 2014/0119367 | A1 | 5/2014 | Han et al. |
| 2014/0123212 | A1 | 5/2014 | Wanser et al. |
| 2014/0133456 | A1 | 5/2014 | Donepudi et al. |
| 2015/0082308 | A1 | 3/2015 | Kiess |
| 2015/0261517 | A1 | 9/2015 | Hodge |
| 2016/0050120 | A1 | 2/2016 | Liu et al. |
| 2016/0062746 | A1 | 3/2016 | Chiosi |
| 2017/0324612 | A1 | 11/2017 | Perez et al. |

OTHER PUBLICATIONS

Basak et al., "Virtualizing networking and security in the cloud," 9 pages, Dec. 2010.

Das et al., "Study of Network Migration to New Technologies using Agent-based Modeling Techniques," Jan. 9, 2014.

Dixit et al., "Towards an Elastic Distributed SDN Controller," HotSDN'13, ACM, pp. 7-12, Aug. 16, 2013.

Gavas et al., "A Review on the Acceleration in Networking Fostered by Software Defined Networking," International Journal of Advance Research in Computer Science and Management Studies, vol. 2, Issue 3, pp. 95-99, Mar. 2014.

Keller et al., "Template Embedding: Using Application Architecture to Allocate Resources in Distributed Clouds," 9 pages, Dec. 2014.

Schranzhofer et al., "Dynamic and adaptive allocation of applications on MPSoC platforms," 6 pages, 2010.

Song et al., "Unified POF Programming for Diversified SDN Date Plane," May 1, 2014.

* cited by examiner

SOFTWARE DEFINED NETWORK CONTROLLER

CROSS-REFERENCE TO RELATED APPLICATION(S)

This application is a continuation patent application of U.S. patent application No. 16/521,496, filed Jul. 24, 2019 and titled "Software Defined Network Controller," which is a continuation patent application of U.S. patent application No. 15/256,675, filed Sep. 5, 2016 and titled "Software Defined Network Controller," now U.S. Pat. No. 10,365,899, which is a continuation patent application of U.S. patent application No. 14/471,534, filed Aug. 28, 2014 and titled "Software Defined Network Controller," now U.S. Pat. No. 9,436,443, the disclosures of which are hereby incorporated herein by reference in their entireties.

BACKGROUND

In some modern communications networks, service instantiation and management can be a labor intensive process. Services in modern networks typically are provided by vendor equipment that can be custom made to provide the desired functions. In addition to the time required to create and manufacture the desired equipment, operations required at the network to accommodate or incorporate the new equipment may result in long lead times and/or delayed service instantiation, and because of the steps required to configure and/or accommodate resources, activating a service may be a long process that cannot be shortened.

Furthermore, redirection of flows in networks generally can be performed by a control plane associated with each vendor. Generally, the control plane can be integrated with the data plane and therefore these planes may be inseparable from one another. Similarly, in modern networks, service and network configurations may be intertwined. Thus, if an operator changes a network element, the service itself may be re-defined. Still further, in modern networks access service features may be intertwined with flow service features. Thus, each flow service may need to specify particular access services.

Because of these and other factors, each function of a service on a network may be handled by different equipment, vendor control functionality, and/or network organizations. This approach, as well as the need to redefine services as equipment is added, updated, or replaced, can create difficulties. In particular, because services, resources, and flows may be intertwined with one another, changing one of the three may affect the others and create obstacles to service creation, instantiation, execution, and/or service management after activation.

Furthermore, the complexity of network changes and/or service changes can require that various development, test, deployment, and user acceptance testing ("UAT") and operational readiness testing ("ORT") operations may need to be iterated multiple times on a proposed service to ensure that the service is ready for deployment. This iterative process can take months. As a result, deployment of a service may be an extended process and by the time the service is activated, some equipment or functionality may be obsolete. If equipment or functionality is upgraded, the iterative process must begin anew, resulting in further delays and complexity.

Operation support systems ("OSS") can currently be used to create services. The process is very laborious where a product manager will define a service in writing and hand off to the system engineer who will define the service in a more detail technical specification which defines not only the service but the network configuration based on a specific vendor network element. This technical specification is then handed off to the software designer who translates this specification into a software architecture and design. Then the developer codes the software which is then tested and validated against the product manager and system engineer and software architecture and design.

All the above-described manual handoffs of documents can be slow and laborious since many reviews of all the parties may be needed to make sure concepts and details are understood and aligned. Then the various phases of testing can be done by different groups who may interpret and validate the software delivered from different perspectives—software architecture and design, system engineering and finally product management's original description. Many of today's network and services have distributed control. This can be cumbersome in updating and changing flows or services from a network wide or customer perspective vs a nodal view.

SUMMARY

The present disclosure is directed to a software defined network and service controller (hereinafter referred to as a "software defined network controller"). The software defined network controller can be provided by a computing system executing computer-executable instructions and/or modules to provide various functions. In some embodiments, multiple computer systems or processors can provide the functionality illustrated and described herein with respect to the software defined network controller. For purposes of simplifying description of the concepts and technologies described herein, the software defined network controller is illustrated and described herein as being provided by a single computing system. For the reasons set forth above, it should be understood that this example is illustrative and therefore should not be construed as being limiting in any way.

In some embodiments, the software defined network controller can include various components and/or can be provided via cooperation of various network devices or components. In some implementations, the software defined network controller can include a network resource controller or network resource autonomous controller, a service resource controller or service control interpreter, one or more adapters, one or more application programming interfaces, one or more compilers, and a network data collection and analytics engine. The software defined network controller also can include or access an inventory, which can include a collection of resources (e.g. network object statistics, events or alarms, topology, state changes). These and other components of the software defined network controller can use and/or can generate one or more templates, one or more model files, and one or more directed graphs to provide the functionality described herein. In some embodiments, a template can include a compiled version or form of a directed graph. In some embodiments, a software defined network framework includes the software defined network controller, a portal communicating with and/or exposed by the software defined network controller or software defined network framework, and one or more orchestrators such as a service orchestrator and a cloud orchestrator.

A service request can be received by a customer (e.g., via the portal), and provided to the software defined network controller for service creation, instantiation, and management. According to various embodiments, the service request can be analyzed by the software defined network controller. A model or model file can define what services, features, and/or functions are requested, and can be configured so that requests will use a corresponding directed graph or template. The model can define features of the service and can be generated in a programming language or format such as extensible markup language ("XML"), Yang models, other types of files, combinations thereof, or the like.

The software defined network controller can use service and networking templates stored at or accessible to the software defined network controller. The features requested in the service request can be matched to the templates, and the software defined network controller can assemble a service from the templates. The software defined network controller can compile the assembled templates and with a real time network map, create a directed graph that can configure the network elements based on a specific sequence defined by the directed graph. Upon successful validation, the software defined network controller can interact with network elements such as the service orchestrator (which may be one of the clients that imitates events to the software defined network controller) and the cloud orchestrator to instantiate resources (e.g., compute, storage and local networking in a virtual environment), and to instantiate the service. According to various embodiments, the software defined network controller can configure physical and virtual network functions and the cloud orchestrator can instantiate the virtual network functions (e.g., virtual machines ("VMs")). After virtual network function instantiation, the software defined network controller can configure, monitor, and manage the service. In some embodiments, the software defined network controller can receive or get events from the network and trigger a directed graph to execute the logic of the intended service, feature, or flow.

Some embodiments of the software defined network controller illustrated and described herein can allow separation of a control plane from a data plane, as well as creation of abstraction layers that separate service and network functions or elements from physical network functions or elements. In some embodiments, there can be four defined layers, namely, a service layer, which can be independent of the network layer and any associated vendor idiosyncrasies; a network abstraction layer, which can be independent of the vendor network element idiosyncrasies; a vendor network layer, which can define the vendor idiosyncrasies; and an access layer, which can be separate for the different network functions that may be defined.

The software defined network controller can be used for networking functions and application/service functions. Thus, the software defined network controller can manage transport functions for layers zero through four as well as application functions for layers four and higher. The software defined network controller can provide a platform for network services, network control of service instantiation and management, as well as a programmable environment for resource and traffic management. The software defined network controller also can provide a consolidated network management interface to permit the combination of real time data from the service and network elements with realtime or near realtime control of the forwarding plane. Thus, embodiments of the concepts and technologies described herein can enable near realtime configuration and realtime flow setup, programmability through service and network script-like logic, extensibility for competitive differentiation, standard interfaces, and multi-vendor support, among other features. Interactions between these layers can be based upon policies to determine optimum configuration and rapid adaptation of the network to changing state and changing customer requirements for example, spikes in traffic, network outages (e.g., due to snow storms, blackouts, natural disasters, or the like), adding new services (e.g., VoIP/web RTC, authentication, etc.), maintenance, combinations thereof, or the like.

The software defined network controller can support legacy and emerging protocols through the use of adapters. According to various embodiments of the concepts and technologies described herein, there can be various types of adapters including, but not necessarily limited to, configurator or adapters that can write to the network elements, and listening adapters that can collect statistics and alarms for the data collection and analytic engine as well as for fault and performance management. This modularity can allow the higher level functions of compiler, service controller, network controller, and data collection and analytics to be optimized and developed independently of the specific vendor network equipment being controlled.

The software defined network controller can enable separation of service control from network resource control. This separation can enable abstraction of a service definition from a particular type of network resource used to implement the service. A service can be independently defined from the actual network layer and vendor specifics. This approach can enable separation of access service features from flow service features, which in turn can allow access services to connect to different flow services quickly. Customer access may no longer be tied to a service so that for the same physical connection, services and features that can be accessed over a connection can be added, removed, evolved, combined, or otherwise modified. Currently such modifications would require multiple access connections, one for each service. This approach therefore can allow the creation of a set of building blocks in creating a service. The customer can pick the access (e.g., DSL, Broadband, Private Line, IP, VPN, etc.) independent of the service required. In some embodiments, this approach can provide several benefits such as, for example, faster time to market in instantiation of network elements as well as new services; an ability to match network features, performance, and capabilities to customer needs on-demand; and an ability to allocate network resources for an individual customer while maintaining network and operational efficiencies.

The software defined network controller can cooperate with a cloud orchestrator, which can instantiate a virtualized environment including compute, storage, and data center networking for virtual applications. This approach can allow on-demand instantiation of network elements at on-demand locations to support network services for a customer or for the autonomous network resource controller where capacity is needed or backup of network elements due to failures. Thus, embodiments of the concepts and technologies described herein can allow movement of the service functions to the traffic flow, instead of being required to move traffic flows to the desired service functions.

The network resource controller can also cooperate with a cloud orchestrator in instantiating network services to support the network configuration in connecting the different VMs the cloud orchestrator is setting up. This can include the configuration of the virtual networks, which may be in the hypervisor, the top of rack, the cloud network fabric, and/or the IP provider edge, which can connect the cloud network with the service provider WAN network.

In some implementations, the software defined network controller can be configured to translate formal information data or models describing services into programmable logic modules. The goal is to replace the multiple paper handoffs of product management service definition to system engineering design and specifications to software architecture and design to software development. The formal data models or templates can be inputs into the network resource controller, which can compile and create the actual steps necessary to configure the vendor specific network elements. The formal information data or models can allow separation of service definitions from vendor specific implementations. A programming language can be used to define service and network templates. These templates can be matched to the desired service features, the matched templates can be assembled by the software defined network controller to create a template-based service representation, the template-based service representation can be compiled by the software defined network controller, and the compiled template-based service representation can be validated using emulated field test environments to validate the service. After validation, the service can be ready for instantiation on the network and the software defined network controller can interact with network elements to deploy the service and/or can issue commands to effect the deployment.

According to one aspect of the concepts and technologies disclosed herein, a method is disclosed. The method can include obtaining, at a computer system including a processor, a model that represents a service, determining, by the processor, resources that support the service, and accessing, by the processor, templates to identify templates that relate to the resources. The method further can include assembling, by the processor, the templates identified to obtain a template-based representation of the service, and compiling, by the processor, the template-based representation to determine if the service is ready for deployment.

In some embodiments, the model can include a file in a programming language. In some implementations, the model can include a Yang model. In some embodiments, the method also can include determining, by the processor, a process flow that supports the service, and accessing, by the processor, the templates to identify further templates that relate to the process flow. The resources can include physical network functions and virtual network functions. The templates can include a network template, which can describe the network abstraction layer. The templates also can include a service template, which can describe the service independent of the network layer. The templates also can include a device template, which can describe the vendor-specific elements. Also, the templates can include a directed graph template, which can describe the exact sequence of the compiler nodes to be executed. It should be understood that additional or alternative templates can be included, in various embodiments.

In some embodiments, the method can include emulating, by the processor, a field test of the service to determine if the service is ready for deployment. The processor can determine that the service is ready for deployment based upon the emulating. The method also can include determining that the resource is ready to support the service, issuing a first command to allocate the resource, and issuing a second command to load a function to the resource.

In some embodiments, the method also can include activating the service, and monitoring the service. In some instances, obtaining the service model can include obtaining a service request, identifying, via analysis of the service request, a service feature to be included in the service requested, and generating the service model. The method also can include obtaining a directed graph from a data storage device, and operating the direct graph on the model to gather data items, select resources, apply network and customer policies, and pass a data set to an adaptor to change a network state According to another aspect of the concepts and technologies disclosed herein, a system is disclosed. The system can include a processor and a memory. The memory can store computer-executable instructions that, when executed by the processor, can cause the processor to perform operations. The operations can include obtaining a model that represents a service, determining resources that support the service, accessing templates to identify templates that relate to the resources, assembling the templates identified to obtain a template-based representation of the service, and compiling the template-based representation to determine if the service is ready for deployment.

In some embodiments, the computer-executable instructions, when executed by the processor, can cause the processor to perform operations further including determining that the service is ready for deployment based upon the compiling, determining that the resource is ready to support the service, issuing a first command to allocate the resource, and issuing a second command to load a function to the resource. In some embodiments, the computer-executable instructions, when executed by the processor, can cause the processor to perform operations further including activating the service, and monitoring the service.

In some embodiments, obtaining the model can include obtaining a service request, identifying, via analysis of the service request, a service feature to be included in the service requested, and generating the service model. In some embodiments, the computer-executable instructions, when executed by the processor, can cause the processor to perform operations further including obtaining a directed graph from a data storage device, and operating the direct graph on the model to gather data items, select resources, and pass a data set to an adaptor to change a network state.

According to yet another aspect, a computer storage medium is disclosed. The computer storage medium can have computer-executable instructions stored thereon that, when executed by a processor, can cause the processor to perform operations. The operations can include obtaining a model that represents a service, determining resources that support the service, accessing templates to identify templates that relate to the resources, assembling the templates identified to obtain a template-based representation of the service, and compiling the template-based representation to instantiate the service in the network or to optionally determine if the service is ready for deployment.

In some embodiments, the computer-executable instructions, when executed by the processor, can cause the processor to perform operations further including determining that the service is ready for deployment based upon the compiling, determining that the resource is ready to support the service, issuing a first command to allocate the resource, and issuing a second command to load a function to the resource. In some embodiments, obtaining the model can include obtaining a service request, identifying, via analysis of the service request, a service feature to be included in the service requested, and generating the service model. In some embodiments, the computer-executable instructions, when executed by the processor, can cause the processor to perform operations further including obtaining a directed graph from a data storage device, and operating the direct graph on the model to gather data items, select resources, and pass a data set to an adaptor to change a network state.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
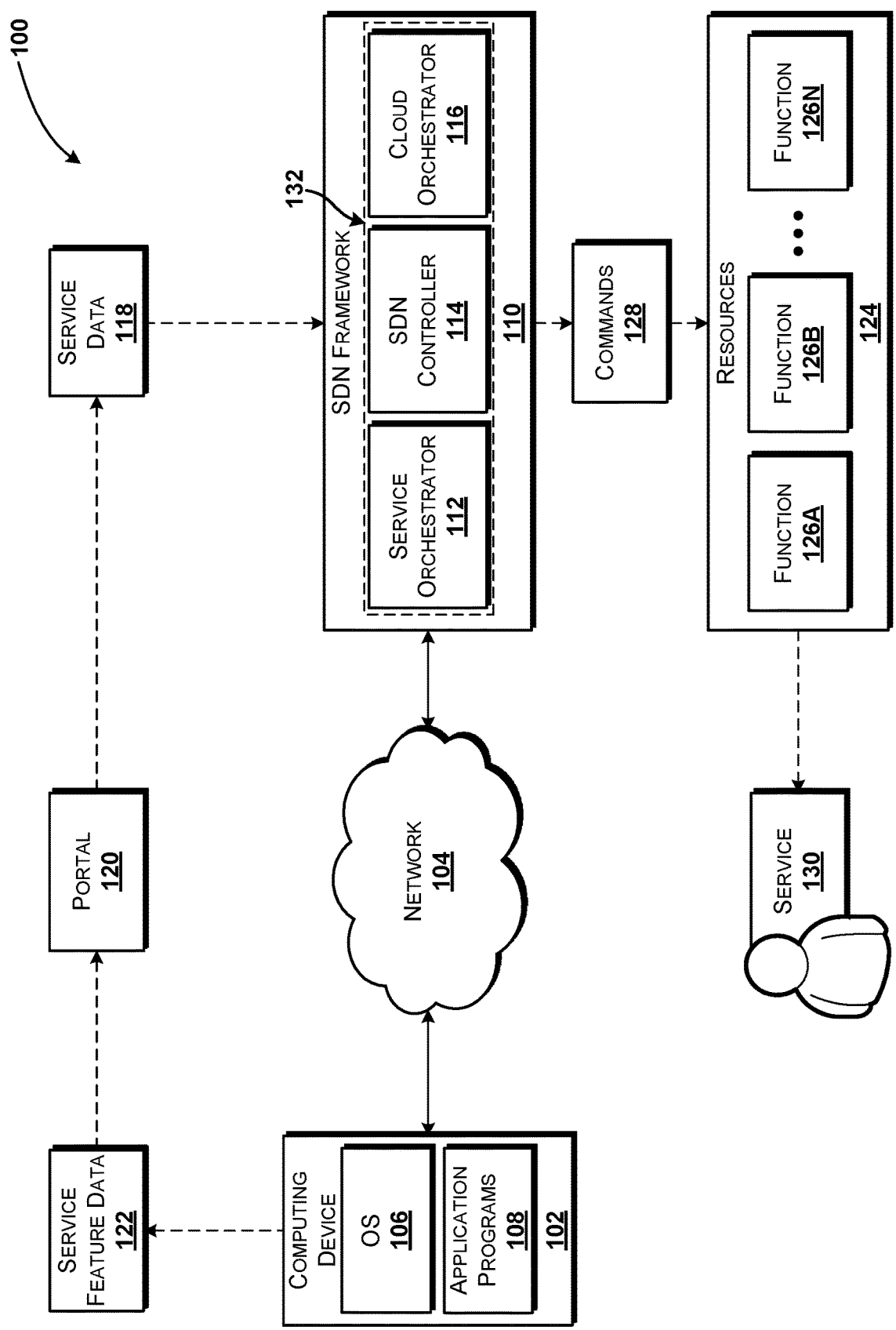
FIG. 1 is a system diagram illustrating an illustrative operating environment for the various embodiments of the concepts and technologies described herein.

The following detailed description is directed to a software defined network controller. The software defined network controller can be provided by a computing system executing computer-executable instructions and/or modules to provide various functions as illustrated and described herein. In some embodiments, the software defined network controller can include a network resource controller, a service resource controller, adapters, one or more application programming interfaces, one or more compilers, and a network data collection and analytics engine, and can use or generate one or more templates, model files, and directed graphs to provide the functionality described herein. In some embodiments, a software defined network framework can include the software defined network controller, a portal communicating with and/or exposed by the software defined network controller or software defined network framework, and one or more orchestrators such as a service orchestrator and a cloud orchestrator.

A service request can be received by a customer (e.g., via the portal), and provided to the software defined network controller for service creation, instantiation, and management. According to various embodiments, the service request can be analyzed by the software defined network controller and a set composed of a directed graph and the associated model or model files are selected. The model can define features of the service and can generated in a programming language or format such as XML, Yang models, other types of files, combinations thereof, or the like. The selected directed graph can be used at runtime to fill in the event-specific details from the application programming interface ("API"), the resource allocations per the directed graph and the resource model, and one or more state changes in the network through the adapters.

The software defined network controller can use service and networking templates stored at or accessible to the software defined network controller and assemble a service from the templates. The assembled templates can be compiled and subjected to emulated field testing to validate the service (with the directed graphs). Upon successful validation, the software defined network controller can interact with the service orchestrator and the cloud orchestrator to configure physical resources, to load functions to the resources, and to instantiate or deploy the service. After service instantiation, the software defined network controller can monitor and manage the service including responding to either changes in the telemetry or new events from the network or other systems.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing and/or interacting with a software defined network controller will be described, according to an illustrative embodiment. The operating environment 100 shown in FIG. 1 includes a computing device 102. The computing device 102 can operate in communication with and/or as a part of a communications network ("network") 104.

According to various embodiments, the functionality of the computing device 102 may be provided by one or more server computers, desktop computers, mobile telephones, smartphones, laptop computers, set-top boxes, other computing systems, and the like. It should be understood that the functionality of the computing device 102 can be provided by a single device, by two similar devices, and/or by two or more dissimilar devices. For purposes of describing the concepts and technologies disclosed herein, the computing device 102 is described herein as a workstation or personal computer. It should be understood that this embodiment is illustrative, and should not be construed as being limiting in any way.

The computing device 102 can execute an operating system 106 and one or more application programs 108. The operating system 106 is a computer program that controls the operation of the computing device 102. The application programs 108 are executable programs that are configured to execute on top of the operating system 106 to provide various functions. According to various embodiments, the application programs 108 can include web browsers, productivity software, messaging applications, combinations thereof, or the like.

According to yet other embodiments, the application programs 108 can include applications that enable interactions between the computing device 102 and other devices or entities. In some contemplated embodiments, the application programs 108 provide functionality for interacting with and/or communicating with a software defined network framework (labeled "SDN framework" in FIG. 1) 110, elements associated with the software defined network framework 110, and/or portals or application programming interfaces exposed by the software defined network framework 110.

According to various embodiments, the software defined network framework 110 can include a service orchestrator 112, a software defined network controller (labeled "SDN controller" in FIG. 1) 114, a cloud orchestrator 116, and/or other elements (not shown in FIG. 1). The functionality of the software defined network framework 110 and the software defined network controller 114 will be briefly explained in FIG. 1 and described in additional detail below, particularly with reference to FIGS. 2-5.

Although the service orchestrator 112, the software defined network controller 114, and the cloud orchestrator 116 are shown as being included within the software defined network framework 110, it should be understood that each of these components, or combinations thereof, may be embodied as or in stand-alone devices or components thereof operating as part of or in communication with the network 104 and/or as the software defined network framework 110. Similarly, while some other components are illustrated in FIG. 1 as being external to the software defined network framework 110, it should be understood that these elements can exist as part of the software defined network framework 110 in some embodiments. As such, the illustrated embodiment should be understood as being illustrative of only some contemplated embodiments and should not be construed as being limiting in any way.

Briefly, the software defined network framework 110 is an architecture that is designed to enable a shortened service conception-to-deployment timeline, as well as enabling improved service management functionality. In particular, the software defined network framework 110 can receive or obtain service data 118. According to various embodiments, the service data 118 can be received or obtained in the form of a programing language file, in the form of a request or order, combinations thereof, or the like. The programming language file can be written in various languages and/or can include various types of models or the like. In some contemplated embodiments, the service data 118 is provided by one or more Yang files, one or more XML files, one or more hypertext markup language ("HTML") files, one or more scripts and/or programming language files, files in other languages or formats, combinations thereof, or the like.

In some other embodiments, the service data 118 can include other types of data. For example, the service data 118 can include application objects, requests for particular services or functions, combinations thereof, or the like. Thus, the service data 118 can include objects that define service functions that are desired, requests for generation of services and/or requests for particular functionality, queries, combinations thereof, or the like. It should be understood that these examples are illustrative and therefore should not be construed as being limiting in any way.

According to various embodiments of the concepts and technologies described herein, the software defined network framework 110 can include, expose, and/or communicate with a portal 120. The functionality of the portal 120 can be provided, in various embodiments, by an application hosted and/or executed by a computing device such as a server computer, a web server, a personal computer, or the like. In some other embodiments, the functionality of the portal 120 can be provided by a module or application hosted or executed by one or more computing devices. Thus, it can be appreciated that the functionality of the portal 120 can be provided by a hardware or software module executed by one or more devices that provide the software defined network framework 110 and/or by other devices. Because the portal 120 can be provided in additional and/or alternative ways, it should be understood that these examples are illustrative and therefore should not be construed as being limiting in any way.

According to various implementations, the computing device 102 communicates with the portal 120 to define or request particular service features. According to various embodiments, the computing device 102 can provide to the portal 120 or define, via the portal 120, service feature data 122 that represents service features desired or needed in a service being created and/or instantiated via the software defined network framework 110. Thus, it can be appreciated that the computing device 102 can be interacted with by a customer, by a network operator, by a business support entity, combinations thereof, or the like, to order or request services from the software defined network framework 110. It should be understood that this example is illustrative and therefore should not be construed as being limiting in any way.

According to various embodiments, the service feature data 122 can be generated or provided via interactions between the computing device 102 and the portal 120. In some example embodiments, the service feature data 122 can be provided via making selections from menus, drop-down lists, fields, tables, or other data or object selection mechanisms that may be provided by the portal 120 and/or the application programs 108 executing on the computing device 102. In some embodiments, the application programs 108 include a web browser application or other application that can obtain data from the portal 120, and the application programs 108 can use the data to generate and present a user interface at the computing device 102. The user interface can include possible service features, and a user or other entity can select the desired features, drag and drop desired features, and/or otherwise indicate desired features in a service.

Regardless of how service features are defined and/or selected by a user or other entity using interactions between the computing device 102 and the portal 120, the service feature data 122 can represent the feature choices or definitions made. The portal 120 can be configured to obtain the service feature data 122 and generate and/or output the service data 118 as a programming file or in a programming file format. Because the portal can be built into the software defined network framework 110, and because the computing device 102 can, in some embodiments, provide the above-described functionality of the portal 120, it should be understood that these examples are illustrative and therefore should not be construed as being limiting in any way.

The service data 118 can be received at the software defined network framework 110. According to some embodiments, the software defined network controller 114 can obtain the service data 118 and understand the service data 118 to be a request for a service and to define the service features or functions desired. The service data 118 can be received at the software defined network controller 114 via one or more application programming interfaces ("APIs") exposed by the software defined network controller 114.

The software defined network controller 114 can analyze the service data 118 and identify service features indicated by and/or associated with the requested service. Thus, it can be appreciated that the service data 118 can correspond to a service request. Based upon the service request and/or other implementation of the service data 118, the software defined network controller 114 can identify one or more service features associated with a service.

As used herein, a "service feature" can be used to refer to an operation, a set of operations, a process, a method, a combination thereof, or the like associated with a service. Thus, for example, if the service provides the ability to check an email service for new messages, the feature identified by the software defined network controller 114 can correspond to checking for new email messages. It therefore can be appreciated that any function, functionality, set or subset of functions or functionality, processes or set of processes, method flows, work flows, combinations thereof, or the like can correspond to a service feature. As such, the above example should be understood as being illustrative of one example feature and therefore should not be construed as being limiting in any way.

The software defined network controller 114 can analyze the service request and/or other implementation of the service data 118 to identify each of one or more features associated with the requested service. The identification of service features can be iterated by the software defined network controller 114 until each feature is identified. Upon determining that additional features associated with the service do not remain, the software defined network controller 114 can generate and output a service model that represents the requested service. In some other embodiments, the software defined network controller 114 can receive a service model.

The software defined network controller 114 can analyze policies or policy defined for a service. This policy can include network engineering rules, which can be defined by a network designer, engineer, business unit, operations personnel, or the like, or a subscriber policy, which can be defined during ordering of the service. Subscriber policies can include, for example, service level agreements ("SLAs"), location restrictions (e.g., locations at which the services are allowed or not allowed), bandwidth ranges, time restrictions (e.g., times of day, days of week, or other times at which the service is allowed or not allowed), security restrictions or policies, combinations thereof, or the like.

According to various embodiments, the service model (also referred to herein as a "model" or "model file") can be a file that represents the service. The service model can be formatted in a programming language such as XML, Yang files, and/or other programming languages, protocols, scripts, or the like. The service model can be generated by the portal 120 in some embodiments. In other embodiments, the service data 118 can be provided to the software defined network framework 110, and one or more of the elements of the software defined network framework 110 can generate the service model. In yet other embodiments, the engineers, network operators, or other entities can generate the service models and the software defined network controller 114 can compile the service models to generate schema and place holder variables from the directed graph (e.g., in the case of a network model) or create REST API logic (e.g., in the case of a service model). It should be understood that this example is illustrative and therefore should not be construed as being limiting in any way.

Regardless of how the service model is obtained at the software defined network controller 114, the software defined network controller 114 can analyze the service model to determine one or more physical network functions or other resources 124 that will be needed or used to support the service. The software defined network controller 114 also can analyze the service model to identify one or more virtual network functions or other functions 126A-N (hereinafter collectively and/or generically referred to as "functions 126") that will support or provide the features of the service. The software defined network controller 114 also can determine, via analysis of the service model, process flows between the various resources 124 and/or functions 126 used to support or provide the service features.

Upon or while identifying the resources 124 and/or functions 126 used to support or provide the features (e.g., selecting the directed graph), the software defined network controller 114 can access one or more service or network templates, which are generically referred to herein as "templates." The templates are illustrated and described in more detail below with reference to FIG. 2. Briefly, the templates can identify resources and/or functions that can be combined to provide a service that includes the desired features. Thus, the software defined network controller 114 can be configured to maintain or access a library of network, service, and/or service feature templates, and to assemble services from the templates to create a template-based representation of the desired service.

According to various embodiments of the concepts and technologies described herein, the templates can be used for several reasons. First, the use of the templates by the software defined network controller 114 can help ensure that features, resources 124, and/or functions 126 are consistently defined across various services. Second, the use of the templates can enable rapid prototyping and/or instantiation of services and/or service functions by the software defined network controller 114 by providing a predefined definition of the resources 124 and/or the functions 126. The templates also can be used to generate REST APIs, data store schema, and variables to be operated on by the directed graphs.

It can be appreciated that in the past, the resources 124 and the functions 126 operated together, namely, that particular hardware provided particular functionality. Thus, some embodiments of the concepts and technologies described herein can be used to decouple the resources 124 from the functions 126 and as such, the resources 124 and the functions 126 can be identified by the software defined network controller 114. According to some embodiments, the software defined network controller 114 can assemble the templates to provide a template-based representation of the service requested as noted above.

After assembling the service from the templates, the software defined network controller 114 can execute one or more compilers (illustrated and described in more detail below with reference to FIG. 2) to compile the template-based representation of the service. The compilers can ensure that the templates are compatible with one another, that the various network and/or application services are assembled correctly and/or can function as intended, and/or that the assembled templates, if actualized as a service, will provide the desired features of the service. Thus, the compilers can determine if output from one template feature is compatible with input for another template feature, if communications can flow through the selected elements, if all features are represented, and the like.

The software defined network controller 114 also can emulate a field test of the assembled and compiled templates to determine if the service is ready for instantiation on the network. The software defined network controller 114 can assemble, compile, and test the templates until the software defined network controller 114 determines that the service is ready to be instantiated on a network such as the network 104. Thus, while the assembly and testing of the service according to embodiments of the concepts and technologies described herein may be iterative, the iterative process can be executed by the software defined network controller 114, thereby reducing lead time and providing rapid service creation and deployment in some example embodiments. It should be understood that this example is illustrative and therefore should not be construed as being limiting in any way.

Upon determining that the service is ready for instantiation or deployment on the network 104, the software defined network controller 114 can determine if the resources 124 determined to be needed for the service are ready. According to some embodiments, the software defined network controller 114 can query various elements of the software defined network framework 110 and/or of the network 104 to determine if the resources 124 are ready. In particular, the software defined network controller 114 can determine that some resources 124 are ready and/or can communicate with one or more orchestrators or other elements such as the service orchestrator 112 and/or cloud orchestrator 116 and those elements can determine if the resources 124 are ready. The functionality for determining if the resources 124 are ready is illustrated and described in more detail below, particularly with reference to FIGS. 2 and 5. Because the resources 124 can be determined to be ready in additional and/or alternative ways, it should be understood that this example is illustrative and therefore should not be construed as being limiting in any way. The software defined network controller 114 also can call a resource manager (e.g., an OSS entity) that may maintain inventor for a resource 124 (e.g., IPv4 addresses in an IP address manager).

Upon determining that the resources 124 are ready, the software defined network controller 114 can issue one or more commands 128 to allocate the resources 124 and/or to configure the resources 124. The software defined network controller 114 also can issue the commands 128 to load the determined functions 126 to the resources 124. Additionally, the software defined network controller 114 can work with other elements of the software defined network framework 110 and/or network 104 to allocate or configure the resources 124 and/or to load the functions 126 to the resources 124. According to various embodiments, the commands 128 can be issued to various hardware and/or software to allocate resources 124 and/or load functions 126 to the resources 124. After issuing the commands 128, the requested service can effectively be instantiated or deployed on the network as the service 130.

Some embodiments of the concepts and technologies described herein enable a software defined network controller 114 to monitor performance of the service 130 during and/or after deployment. The software defined network controller 114 can manage resources 124 and/or functions 126 associated with the service 130 such as allocating additional resources, reallocating resources, loading new functions, increasing capacity of the resources 124, instantiating new instances of a function 126 at a different location, reducing capacity of the resources 124, combinations thereof, or the like. These and other aspects of the concepts and technologies described herein will be illustrated and described in more detail below, particularly with reference to FIGS. 2-5.

As shown in FIG. 1, the functionality of the software defined network controller 114, illustrated as part of the software defined network framework 110, can be provided by one or more program modules or other computer-executable instructions executed by a processor or processing system. In the illustrated embodiment, the functionality of the software defined network controller 114 can be hosted or executed by a computing system 132. It should be understood that the service orchestrator 112 and the cloud orchestrator 116 can be hosted by one or more computing systems such as the computing system 132. It also should be understood that the software defined network controller 114, the service orchestrator 112, and/or the cloud orchestrator 116 can be executed and/or hosed by one or more processors or processor cores of a computing system such as the computing system 132, for example where a processor of the computing system 132 is a multi-core processor. It should be understood that these examples are illustrative and therefore should not be construed as being limiting in any way.

According to various embodiments, the functionality of the computing system 132 may be provided by one or more server computers, desktop computers, mobile telephones, smartphones, laptop computers, other computing systems, and the like. It should be understood that the functionality of the computing system 132 can be provided by a single device, by two similar devices, and/or by two or more dissimilar devices. For purposes of describing the concepts and technologies disclosed herein, the computing system 132 is described herein as a server computer. It should be understood that this embodiment is illustrative, and should not be construed as being limiting in any way.

While a single computing system 132 is illustrated in FIG. 1, it should be understood that each of the service orchestrator 112, the software defined network controller 114, and the cloud orchestrator 116 also can be executed and/or hosted by one or more computing systems such as the computing system 132. Because these and other variations and/or implementations of the concepts and technologies described herein are generally understood, the functionality of the computing system 132 will not be further described with reference to FIG. 1. One example architecture of the computing system 132 is illustrated and described below with reference to FIG. 7.

FIG. 1 illustrates one computing device 102, one network 104, one portal 120, one software defined network framework 110, one service 130, and one computing system 132. It should be understood, however, that various implementations of the operating environment 100 can include zero, one, or more than one computing device 102; zero, one, or more than one network 104; zero, one, or more than one software defined network framework 110; zero, one, or more than one portal 120; zero, one, or more than one service 130; and zero, one, or more than one computing system 132. As such, the illustrated embodiment should be understood as being illustrative, and should not be construed as being limiting in any way.

Figure 2:
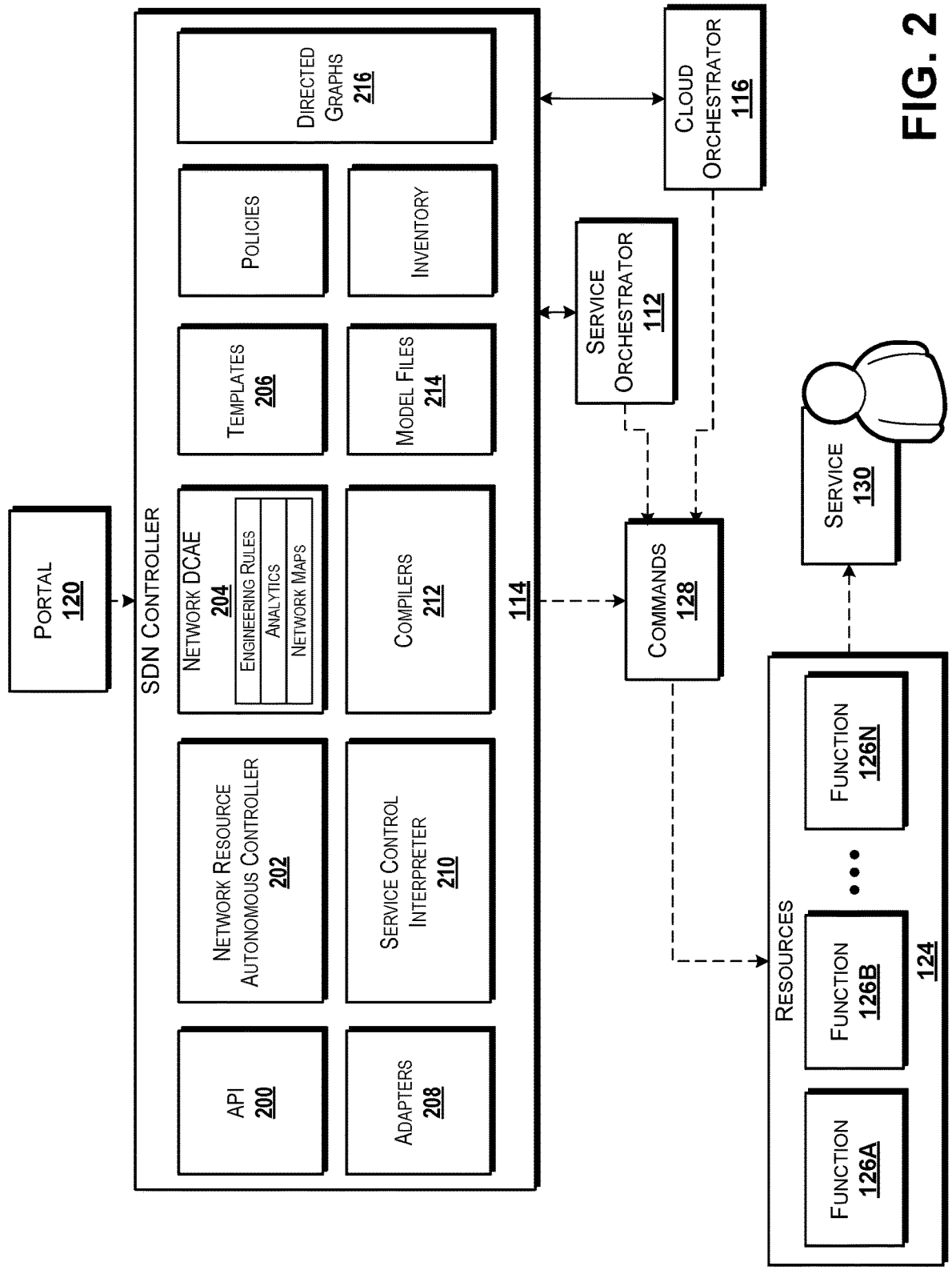
FIG. 2 is a system diagram illustrating an example software defined network controller, according to one example embodiment of the concepts and technologies described herein.

Turning now to FIG. 2, additional aspects of the software defined network controller 114 will be described in detail. In particular, FIG. 2 is a line drawing illustrating components of the software defined network controller 114 and other elements controlled by and/or interacted with by the software defined network controller 114. Because the software defined network controller 114 illustrated and described herein can be implemented in additional and/or alternative systems and/or operating environments, it should be understood that the illustrated embodiment is merely one example embodiment that should not be construed as being limiting in any way the concepts and technologies described herein.

As shown in FIG. 2, the software defined network controller 114 can include an application programming interface ("API") 200, a network resource autonomous controller (also referred to herein as a "network resource controller")

202, a network data collection and analytics engine ("DCAE") 204, templates 206, adapters 208, a service control interpreter (also referred to herein as a "network service controller") 210, compilers 212, model files 214, and directed graphs 216. Although the elements of the software defined network controller 114 and the data used by the software defined network controller 114 are illustrated in FIG. 2 without any connectors or connections therebetween, it should be understood that these and other elements of the software defined network controller 114 can interact with one another and the various data elements to provide the functionality illustrated and described herein. These and other elements shown in FIG. 2 are described in further detail below.

According to various embodiments, the API 200 can be exposed by the software defined network controller 114. In some embodiments, the API 200 is controlled by and/or exposed by an API handler. The API 200 can be a programmable API that can be accessed by entities such as network operations, service providers, customers, support systems, combinations thereof, or the like to allow manipulation of network access and flow service use of service, core, and transport resources. The API 200 can be exposed by the software defined network controller 114 as an abstraction of the service and the network. As such, the customer or higher level application may not be required to know details of a network implementation. Depending on the state of the resources 124 in the network 104 and the service request, a different network implementation could be implemented in realtime.

The network resource autonomous controller 202 can be a module of the software defined network controller 114 (or other entity) that assigns, reassigns, releases, and/or optimizes the resources 124 and functions 126 used to provide the service 130. The network resource autonomous controller 202 can assign or reassign resources 124 needed to support a particular service such as a service 130 requested by the service data 118 as explained in detail above with reference to FIG. 1, and as explained in more detail below with reference to FIG. 5.

According to various embodiments, the network resource autonomous controller 202 can assign or reassign virtual and/or physical network functions (collectively illustrated as functions in FIGS. 1-2) needed to support the service 130. Thus, the network resource autonomous controller 202 can independently assign and/or reassign ports and virtual network function ("VNF") instances for the service 130 based upon network changes (realtime, near realtime, or otherwise). The network resource autonomous controller 202 also can implement and/or manage network-resource utilization optimization functions.

The network resource autonomous controller 202 can operate with virtualized network resources, which can be instantiated on-demand and moved as the state of the network changes due to traffic or failures or because of business policies. For example, the network resources can be moved based upon considerations such as power rates by time-of-day, communication costs over geographic locations, capacity availability shifts and/or costs, combinations thereof, or the like. Thus, the network resource autonomous controller 202 is not required to operate using a service order processes that assumes network resources exist in a fixed location.

The network resource autonomous controller 202 also can monitor and analyze telemetry collected from adapters such as the adapters 208. The data can indicate network state and the like. Based upon analyzing the data, the network resource autonomous controller 202 can determine if changes in the network state are appropriate. If the network resource autonomous controller 202 determines that network changes are appropriate, the network resource autonomous controller 202 can interact with the service control interpreter 210 to implement the intended state change. The network resource autonomous controller 202 also can interact with resource-specific policy and inventory functions for assignment of resources 124 in adherence to engineering rules, which can be stored by and/or accessible to the software defined network controller 114 in various embodiments.

In various embodiments of the concepts and technologies described herein, the network resource autonomous controller 202 can include functions and applications for managing core and transport resources, which can be separated from functions and applications for managing service element resources. Thus, as noted above, the network resource autonomous controller 202 can separate the service resources from the network/hardware resources, allowing a service definition to remain consistent while changing an associated network resource.

The core and transport resources can be tightly related, in some embodiments, to the hardware resources such as the resources 124. The service resources, on the other hand, can correspond to soft resources that are subject to change such as, for example, Internet Protocol ("IP") addresses, virtual local area network identifiers, or the like. It can also be appreciated that the core and transport resources can include telemetry and/or state data that can be collected, analyzed, and used by the network resource autonomous controller 202 to optimize performance of the resources 124. It should be understood that this example is illustrative and therefore should not be construed as being limiting in any way.

The network DCAE 204 can provide analytics on the telemetry and/or state data that can be collected by the adapters 208 and/or other entities. According to various embodiments, the network DCAE 204 can enable the software defined network controller 114 to be a self-optimizing platform. In particular, via the network DCAE 204, the software defined network controller can determine if the state of the network 104 and/or devices should change to optimize one or more policies such as, for example, cost, a service level agreement ("SLA"), reliability, latency, performance, load, capacity, combinations thereof, or the like.

The ability of the software defined network controller 114 to self-optimize its performance and/or network performance can be enabled by the inclusion of the network DCAE 204 to provide storage and analytic support functions needed for analytics. Thus, the network DCAE 204 can provide the ability to provide the software defined network controller 114 with "big data" analytics and functionality without relying on outside analytics and/or analysis as might otherwise be required. The network DCAE 204 can collect and analyze data from the network 104 and/or the resources 124 and functions 126, and compare the data to engineering rules, policies, network maps, and other analytics to determine how performance compares to desired standards. The network DCAE 204 also can be used to analyze events like link failures, router failures, or the like. Because analytics can occur on other data, it should be understood that this example is illustrative and therefore should not be construed as being limiting in any way.

The templates 206 can include software code, modules, scripts, applets, snippets, or other instructions. Each of the templates 206 can define one or more network functions or service functions in a programming language format. Thus, as will be explained in more detail below, the templates 206 can be assembled to represent service features and/or a service, compiled by the software defined network controller 114 and/or the compilers 212, and subjected to emulated field testing to determine if the service will function and/or other validation.

The assembly, compilation, and emulated field testing of services and/or service features by the software defined network controller 114 via use of the templates 206 can be iterated to support quick development and testing. Some embodiments of the concepts and technologies described herein use the templates 206 to enable shortening of the service planning to deployment timeline. It should be understood that this example is illustrative and therefore should not be construed as being limiting in any way.

The adapters 208 can support interactions between the software defined network controller 114 and other network elements. According to various embodiments, the adapters 208 allow interactions between the software defined network controller 114 and network elements using well-defined protocols. The adapters 208 can contain the complexity of vendor specific and protocol specific implementation issues for both changing the state of the network 104 and reading the state of the network 104. This can relieve other aspects of the network from being required to comply with the various vendor-specific and/or network-specific requirements, thereby allowing the software defined network controller 114 to function with and/or across varied vendor platforms and/or protocols. It should be understood that this example is illustrative and therefore should not be construed as being limiting in any way.

Changing the state of the network 104 can be accomplished by the software defined network controller 114 using traditional configuration through template or scripted CLI changes, transactional NetConf/Yang changes, and/or flow changes using protocols such as, for example, BGP, BGP-FlowSpec, OpenFlow, or the like, which can be handled by the adapters 208 (which can function as "write mode" adaptors). Reading the state of the network 104 also can allow for the collection of data through protocols like SNMP, Netconf Stats, OpenFlow stats, BGP routes, OSPF link state, using the adapters 208 (which can function as "read mode" adapters). The data collected by the adapters 208 can be used by the software defined network controller 114 for application processing in autonomous control loops that can result in changes in the network state through the "write" mode adapters. CLI and NetConf adapters can apply to Transport SDN Controllers App Servers, and CSCF's, HLR/HSS Adapters, or the like.

The service control interpreter 210 can be an event-driven component of the software defined network controller 114. The service control interpreter 210 can receive and/or respond to requests from external systems for new services, new connections, and/or new features. According to some embodiments, the service control interpreter 210 can be used to provide the software defined network framework 110 with flexibility. In particular, the service control interpreter 210 can be configured to read directed graphs (e.g., the directed graphs 216) of the network implementation logic that satisfies the incoming service request. The functionality of the concepts and technologies described herein for generating and reading the directed graphs 216 will be illustrated and described in more detail below.

Briefly, by implementing the service-to-network mapping in a flexible directed graph (or in some embodiments a script), changes to the network implementation can be quickly created and tested without requiring changes to the network 104. Thus, new functions may be needed in the engine over time as new adapters or protocols are added to the platform. Generally, however, only the directed graphs 216 may change as capabilities are used in new combinations.

According to various embodiments, the directed graphs 216 can operate on the network and service models (model files 214) to gather the data items, select resources 124 based on interacting with the resource control functions, and passing the data set to the adapters 208 for changing the state of the network 104. The combination of the model files 214 and the direct graphs 216 can be used to create a set of service creation tools that in some implementations of the concepts and technologies described herein can shorten the time to market for new services 130 and/or service features.

According to some embodiments, the service control interpreter 210 can work in conjunction with the one or more of the compilers 212. The compilers 212 can use model files 214 (e.g., XML files, Yang models, or the like) and the network maps or other network logic (which can be defined in one or more XML files or other types of files or objects) to create the directed graph 216 that is to be used during event processing. It should be understood that this example is illustrative and therefore should not be construed as being limiting in any way.

Using this approach, service definitions can be separated from vendor-specific implementations. In particular, an abstraction layer with three distinct components can allow specification and flexible mapping among service, network, and device definitions. The software defined network controller 114 can use the compilers 212 to translate formal information models such as the model files 214 (e.g., XML files, Yang models, etc.) into programmable logic modules as noted above.

Thus, in some embodiments, the compilers 212 can be used to enable these and other functionality. In particular, the software defined network controller 114 can accept as input a set of information and data abstraction models that can define the networking or high-level service that the software defined network controller 114 is to manage. The compilers 212 can operate on the abstraction models such as the model files 214 (e.g., XML files, Yang models, or the like) and the network logic can create the directed graph 216 that is used during event processing as explained above with regard to the service control interpreter 210.

The directed graphs 216 can be used to perform the actual event processing defined by the service and network models. In some embodiments, the directed graphs 216 can define paths through one or more sets of functions. Nodes along the path can execute functions to get, update, and/or release data from the data model and to execute functions based upon the available data. The functions of the directed graph 216 can be nodes that can be included in the directed graphs 216. The nodes (functions) can include, but are not limited to, an allocate function, a set function, a block function, a configure function, a switch function, a sendmessage function, a test function, and a user-defined function, among others.

The allocate function can be used to allocate a resource 124 from either a local or remote resource inventory. The input values that identify the resource 124 being requested and the parameters that influence the decision on how resources 124 (which resource 124, how much capacity of the resource 124, etc.) are allocated can be part of the allocate function and can come from the context memory structured per the network and service data model, in some embodiments. The data returned by the allocate function can be saved in memory or persistent storage using the name defined in the network data model.

The set function can specify or calculate a value that may not be an inventory resource, but rather can be determined from a calculation or algorithm on other variables or applicable engineering rules. The block function can indicate that a set of nodes or functions should succeed or fail. If one node fails, the block function also can include that the network state should be rolled back to a state that existed before the block statement was executed.

The configure function can indicate that a state change on a device should occur. The configure function can indicate what adapter family is to be used to perform the configuration and the operation for a requested action. One of the adapters 208 can obtain data from the context memory per the network data model and can change the state of the network 104. The adapters 208 can use the device data model to map the network configuration data to the vendor-specific device model.

The switch function can include a case statement that can allow a decision in the directed graph 216 to be handled by different logic depending on either a service or network data model variable. The sendmessage function can reply to an event using the service model defined output (or error). The test function can execute a command and/or test against the network 104. This can be similar to the configure function described above, but with the sendmessage function, the change may not be a permanent state change. A test function can be used after the call to a configure function to test that a configuration succeeded.

The user-defined function can allow service and network designers to create new functions or nodes. The user-defined function can allow a designer to define a new function or node, for example as a Java class, and to pass in the attributes in advance of the engine optimizing implementation of the function or node. Over time, user-defined functions can be incorporated into the service logic interpreter engine for efficiency, though this is not necessarily the case. Because additional and/or alternative functions or nodes are possible and are contemplated, the above examples should not be construed as being limiting in any way.

As shown in FIGS. 1-2, the software defined network controller 114 also can interact with the service orchestrator 112 and the cloud orchestrator 116 via various interactions to allocate resources 124, to load functions 126 to the resources 124, and/or to perform other functionality to activate a service 130.

According to various embodiments, the service orchestrator 112 can be responsible for the arrangement, sequencing, and automated implementation of tasks, rules, and policies. The service orchestrator 112 can coordinate logical and physical resources to meet a customer or on-demand request to create, modify, or remove network or service resources. According to various embodiments, the cloud orchestrator 116 can be responsible for the arrangement, sequencing, and automated implementation of tasks, rules, and policies. The cloud orchestrator 116 can coordinate logical and physical cloud resources in order to meet requests to create, modify, or remove compute, storage, and local networking resources. It should be understood that these examples are illustrative and therefore should not be construed as being limiting in any way.

While the software defined network controller 114 can create flows between network functions and can configure services or applications within virtual machines or other resources 124, the service orchestrator 112 and/or the cloud orchestrator 116 can create, update, and delete the virtual machines or other resources 124. Furthermore, while the software defined network controller 114 can participate in flows in processing packets with network protocols, the service orchestrator 112 and/or the cloud orchestrator 116 do not have to participate in the network flows. It should be understood that this example is illustrative and therefore should not be construed as being limiting in any way.

According to various embodiments, the service orchestrator 112, the software defined network controller 114, and the cloud orchestrator 116 can interact to provide the functionality illustrated and described herein for instantiating and/or activating a service. Generally, the service orchestrator 112 can receive a service request, for example from a customer. The service orchestrator 112 can identify a network service controller that is responsible for the requested service and forward the request to the network service controller identified. In some embodiments, the functionality of the network service controller can be provided by the service control interpreter 210 of the software defined network controller 114. It should be understood that a service request also can be an event from the network 104, where the event needs to be processed. It should be understod that this example is illustrative and therefore should not be construed as being limiting in any way.

The network service controller, in turn, can query a network resource controller. In some embodiments, the functionality of the network resource controller can be provided by the network resource autonomous controller 202 of the software defined network controller 114. It should be understood that this example is illustrative and therefore should not be construed as being limiting in any way.

The network resource controller can configure the network resources that will provide the requested service. In some instances, for example where the resources include physical network functions, the network resource controller can configure the resources itself. In some other instances, for example where the resources include virtual network functions, the network resource controller can request configuration of the resources by the cloud orchestrator 116. The cloud orchestrator 116 can configure the resources and inform the network resource controller that the resources are ready for the service. The network resource controller can inform the network service controller that the resources configured by the network resource controller and the cloud orchestrator 116 (and/or other entities) are ready for the service, and the service can be instantiated on the resources.

It should be understood that the above flow is illustrative of one example flow, and that other flows between these and other elements of the software defined network framework 110 are possible and are contemplated. Some example workflows are described below with reference to FIG. 5. As such, it should be understood that the above example flow is illustrative and therefore should not be construed as being limiting in any way.

Figure 3:
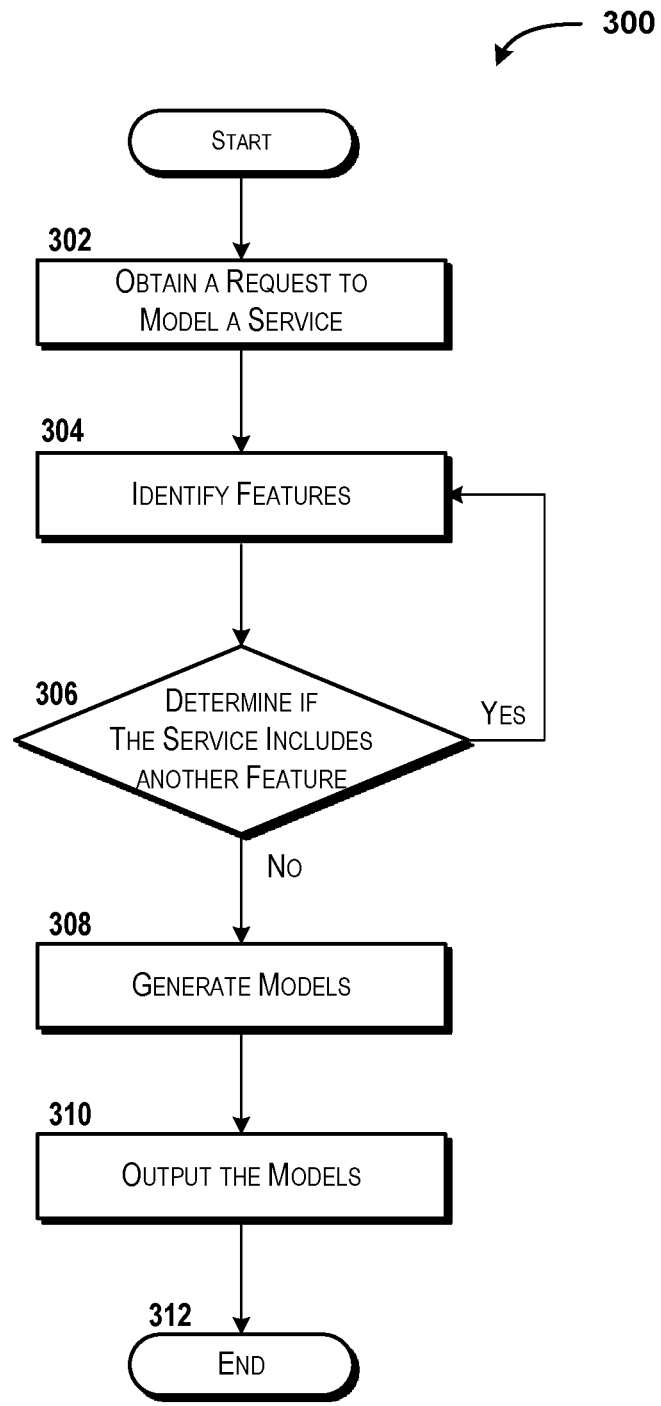
FIG. 3 is a flow diagram showing aspects of a method for generating models that define a service, according to an illustrative embodiment of the concepts and technologies described herein.

Turning now to FIG. 3, aspects of a method 300 for generating models that define a service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, the computing system 132 to perform one or more operations and/or causing the processor to direct other components of the computing system or device to perform one or more of the operations.

For purposes of illustrating and describing the concepts of the present disclosure, the methods disclosed herein are described as being performed by the computing system 132 via execution of one or more software modules. According to various embodiments, the computing system 132 can host or provide the software defined network controller 114 illustrated and described herein. It should be understood that additional and/or alternative devices and/or network nodes can provide the functionality described herein via execution of one or more modules, applications, and/or other software including, but not limited to, the various modules and/or components of the software defined network controller 114. Thus, the illustrated embodiments are illustrative, and should not be viewed as being limiting in any way.

The method 300 begins at operation 302. At operation 302, the computing system 132 can obtain a request to model a service 130. As illustrated and described above with reference to FIG. 1, the request can be included in or provided by the service data 118 and can effectively request instantiation of a service 130, in some embodiments. Thus, it can be appreciated that the request obtained in operation 302 can come from a network operator, a support system or service, a customer, a network entity, service orchestrators, and/or other entities.

According to various embodiments, the computing system 132 can obtain the request by receiving the request. In some other embodiments, the computing system 132 can obtain the request by receiving service data 118 and determining, based upon the receipt of the service data 118, that modeling of a service 130 is being requested. Because the computing system 132 can obtain the request in additional and/or alternative manners, it should be understood that these examples are illustrative and therefore should not be construed as being limiting in any way.

From operation 302, the method 300 proceeds to operation 304. At operation 304, the computing system 132 can identify a feature associated with the service 130 for which modeling has been requested in operation 302. According to various embodiments, the computing system 132 can analyze the request obtained in operation 302 and determine, based upon the analysis, a feature associated with the service 130 for which modeling is being requested.

The features can be explicitly listed, in some embodiments. For example, the request obtained in operation 302 can include, in some embodiments, a list of features to be included in the service 130. In some other embodiments, the computing system 132 can identify the features by analyzing the service data 118 and extracting or parsing the features from the service data 118. Because the features of the service 130 can be identified in additional and/or alternative manners, it should be understood that these examples are illustrative and therefore should not be construed as being limiting in any way.

From operation 304, the method 300 proceeds to operation 306. At operation 306, the computing system 132 can determine if the service 130 for which modeling was requested by way of the request obtained in operation 302 includes additional features. If the computing system 132 determines, in operation 306, that the service 130 includes additional features, the method 300 can return to operation 304, and the computing system 132 can identify another feature.

It can be appreciated that operations 304-306 can be iterated until, in any iteration of operation 306, the computing system 132 determines that the service 130 being modeled does not include another feature. In some embodiments, the computing system 132 can determine that the service 130 does not include additional features by determining that each feature of the requested service 130 has been identified by the computing system 132. It should be understood that this example is illustrative and therefore should not be construed as being limiting in any way.

If the computing system 132 determines, in operation 306, that the service 130 being modeled does not include any additional features, the method 300 can proceed to operation 308. At operation 308, the computing system 132 can generate models relating to the service 130. As used herein, the "models" can include, but are not necessarily limited to, one or more service models, one or more network models, and one or more directed graphs 216. As illustrated and described above with reference to FIGS. 1-2, the service model can indicate functions associated with the service 130, the network model can indicate one or more resources 124 that may host or provide features of the service 130, and the directed graphs 216 can include logic that, when applied to the models, can be used to instantiate the service 130.

According to various embodiments, the service model can be formatted in a programmable language. According to various embodiments, for example, the service model can be formatted as an XML file, a YANG model, a YAML model, or the like. Because other languages, scripts, objects, and/or modelling approaches can be used to generate the models in operation 308, it should be understood that these examples are illustrative and therefore should not be construed as being limiting in any way.

Various algorithms can be executed by the computing system 132 to generate the models in operation 308. In some embodiments, the computing system 132 can represent various features and/or resource functions associated with the service 130 as lines of code, objects, scripts, or the like. The computing system 132 can add the code, objects, scripts, or the like to the models during the model generation illustrated at operation 308 of the method 300. Thus, it can be appreciated that various iterative operations can be executed by the computing system 132 to create the models.

From operation 308, the method 300 proceeds to operation 310. At operation 310, the computing system 132 can output the models. In some embodiments, the models can be stored as or with the model files 214 illustrated and described above with reference to FIG. 2 and therefore may be stored at the software defined network controller 114. In some other embodiments, the models generated in operation 308 can be output by the software defined network controller 114 and used to generate components of the service 130 and/or to instantiate the service 130. Because the models can be output in additional and/or alternative ways, it should be understood that these examples are illustrative and therefore should not be construed as being limiting in any way.

From operation 310, the method 300 proceeds to operation 312. The method 300 ends at operation 312.

Figure 4:
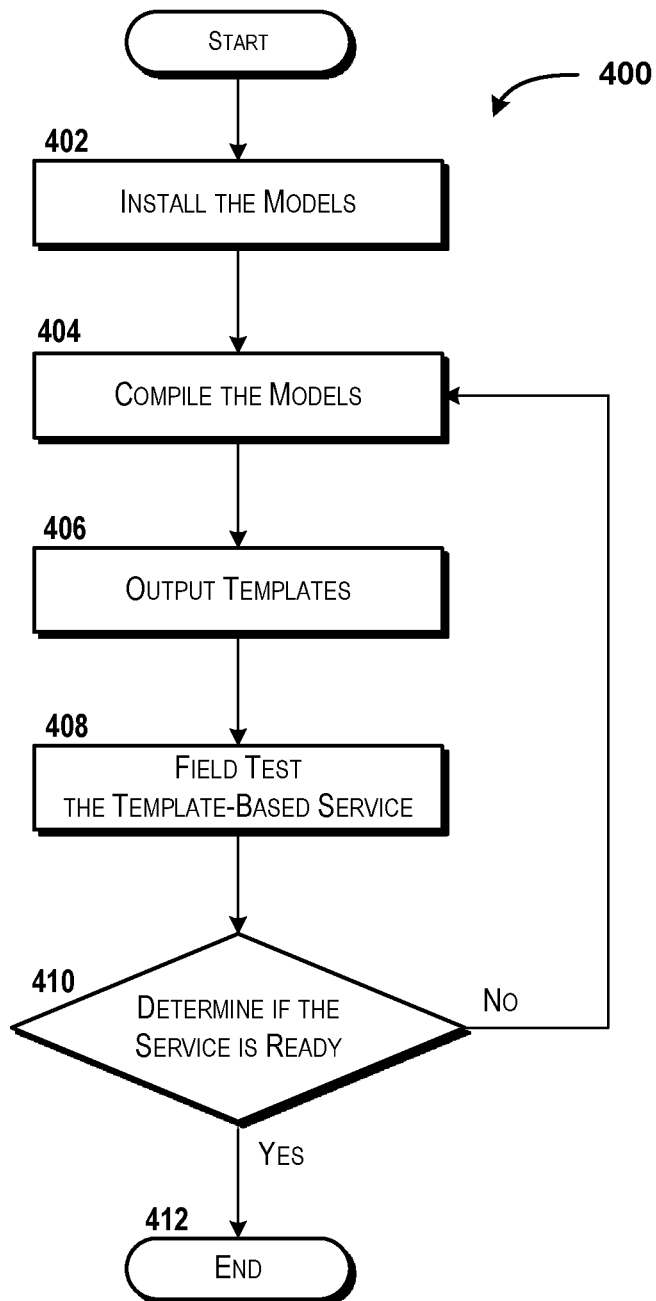
FIG. 4 is a flow diagram showing aspects of a method for compiling models and outputting templates to create a service, according to an illustrative embodiment of the concepts and technologies described herein.

Turning now to FIG. 4, aspects of a method 400 for compiling models and outputting templates to create a service 130 will be described in detail, according to an illustrative embodiment. The method 400 begins at operation 402. At operation 402, the computing system 132 can install one or more models. The models can be installed at the computing system 132, in some embodiments, which also can provide the functionality illustrated and described herein for the software defined network controller 114. In some embodiments, the models can be installed in the inventory shown in FIG. 2, though this is not necessarily the case. In some embodiments, the computing system 132 can obtain the models as output from the method 300 illustrated and described in FIG. 3, though this is not necessarily the case, and install the models at the software defined network controller 114.

Thus, it can be appreciated that the computing system 132 can access the models (and/or the model files 214) at the software defined network controller 114 to obtain the models in operation 402; generate the models in operation 402 (for example, via execution of the method 300); receive the models from other entities in operation 402; combinations thereof; or the like. As explained above, the models can include one or more service models, one or more network models, one or more directed graphs 216 and/or other logic, other models, combinations thereof, or the like. Because the models can be obtained in additional and/or alternative manners, it should be understood that these examples are illustrative and therefore should not be construed as being limiting in any way.

From operation 402, the method 400 proceeds to operation 404. At operation 404, the computing system 132 can compile the models. In operation 404, the computing system 132 can compile the service model to identify one or more resources 124 that will be used to provide the service 130 and/or one or more process flows that will be executed by the resources 124 to provide the service 130 or some functionality associated with the service 130. Thus, in operation 404, the computing system 132 can identify resources 124 such as communication resources, data storage resources, data processing resources, and the like, as well as process flows for how data will pass through these resources 124 and/or to/from the resources.

In operation 404, the computing system 132 also can compile the network models installed in operation 402. Thus, in various embodiments, the computing system 132 can access one or more network maps and/or other data, which can be managed and/or accessed by the computing system 132 and/or the software defined network controller 114 to complete operation 404. As shown in FIG. 2, the network maps, analytics, and/or engineering rules can be maintained, in some embodiments, by the network DCAE 204, though this is not necessarily the case. The computing system 132 can determine, based upon the features, process flows, the network maps, and/or other information, how the data will flow through the network 104 and/or among the resources 124, the functions 126, and/or elements of the network 140 to provide the functionality included in the service 130.

According to various embodiments, operation 404 can include the computing system 132 executing logic corresponding to the directed graphs 216 against the service model. According to various embodiments, operation 404 also can include the computing system 132 executing logic corresponding to the directed graphs 216 against the network model. Thus, the computing system 132 can execute the directed graphs 216 against the models (service models and network models) to output one or more templates 206, which can correspond to functions and resources that will be used to support the service 130. It should be understood that this example is illustrative and therefore should not be construed as being limiting in any way.

From operation 404, the method 400 proceeds to operation 406. At operation 406, the computing system 132 can output templates 206 that can be used to generate a template-based version of the service 130. As illustrated and described above with reference to FIG. 2, business needs and/or service features can be defined as service and/or network templates. As such, the templates 206 can be blocks of programmable code that can represent particular features; process flows; network, application, or service functions; and the like of the service 130.

As illustrated and described above with regard to identifying features in operations 304-306 of the method 300, it should be understood that the computing system 132 can iterate various operations for identifying resources 124, functions 126, and/or process flows in operation 404 until all resources 124, functions 126, and/or process flows have been identified and/or determined. As such, the compiling of the models (the service models, network models, and using the directed graphs 216) can be iterated until all templates 206 corresponding to the service 130 have been output, though operation 404 is only shown once in FIG. 4.

In operation 406, the computing system 132 can output the templates 206 that correspond to the determined resources and process flows to create a template-based representation of the service 130. Thus, it can be appreciated that the computing system 132 can compare the identified service features with features and/or devices embodied by the templates 206, though this is not necessarily the case. In various embodiments, the computing system 132 can, by way of compiling the models (executing the directed graphs against the service models and the network models), output the templates 206. As discussed above, in some embodiments the computing system 132 can iterate operation 406 until templates 206 representing all features, process flows, resources, and/or other aspects of the service 130 have been output and/or until the templates 206 are assembled to represent the service 130. It should be understood that this example is illustrative and therefore should not be construed as being limiting in any way.

From operation 406, the method 400 proceeds to operation 408. At operation 408, the computing system 132 can emulate a field test of the template-based version of the service 130. According to various embodiments, the templates 206 can be assembled by the computing system 132 and/or the software defined network controller 114 executed thereby and validated through an emulated field test environment. This compilation and field test emulation can be iterated quickly to refine any issues in the template-based service and to develop the final contours of the service 130.

From operation 408, the method 400 proceeds to operation 410. At operation 410, the computing system 132 can determine if the service 130 is ready for deployment and/or instantiation on the network 104. The computing system 132 can make the determination illustrated at operation 410 by determining if errors are detected during the compiling, output, and/or emulated field testing illustrated in operations 404-408. Thus, if the template-based representation of the service is successfully validated and/or passes the emulated field test, the computing system 132 can determine that the service 130 is ready for deployment and/or instantiation on the network 104. Because the service 130 can be validated and/or determined to be ready for deployment in additional and/or alternative ways, it should be understood that this example is illustrative and therefore should not be construed as being limiting in any way.

If the computing system 132 determines, in operation 410, that the service 130 is not ready for deployment and/or instantiation, the method 400 can return to operation 404 and the computing system 132 can again compile the models. It can be appreciated that the computing system 132 can replace and/or reassemble the models and/or directed graphs to output new versions of the templates 206. It should be appreciated that the computing system 132 can repeat operations 404-410 until the computing system 132 determines, in any iteration of operation 410, that the service 130 is ready for deployment and/or instantiation.

If the computing system 132 determines, in operation 410, that the service 130 is ready for deployment and/or instantiation, the method 400 can proceed to operation 412. The method 400 ends at operation 412.

Figure 5:
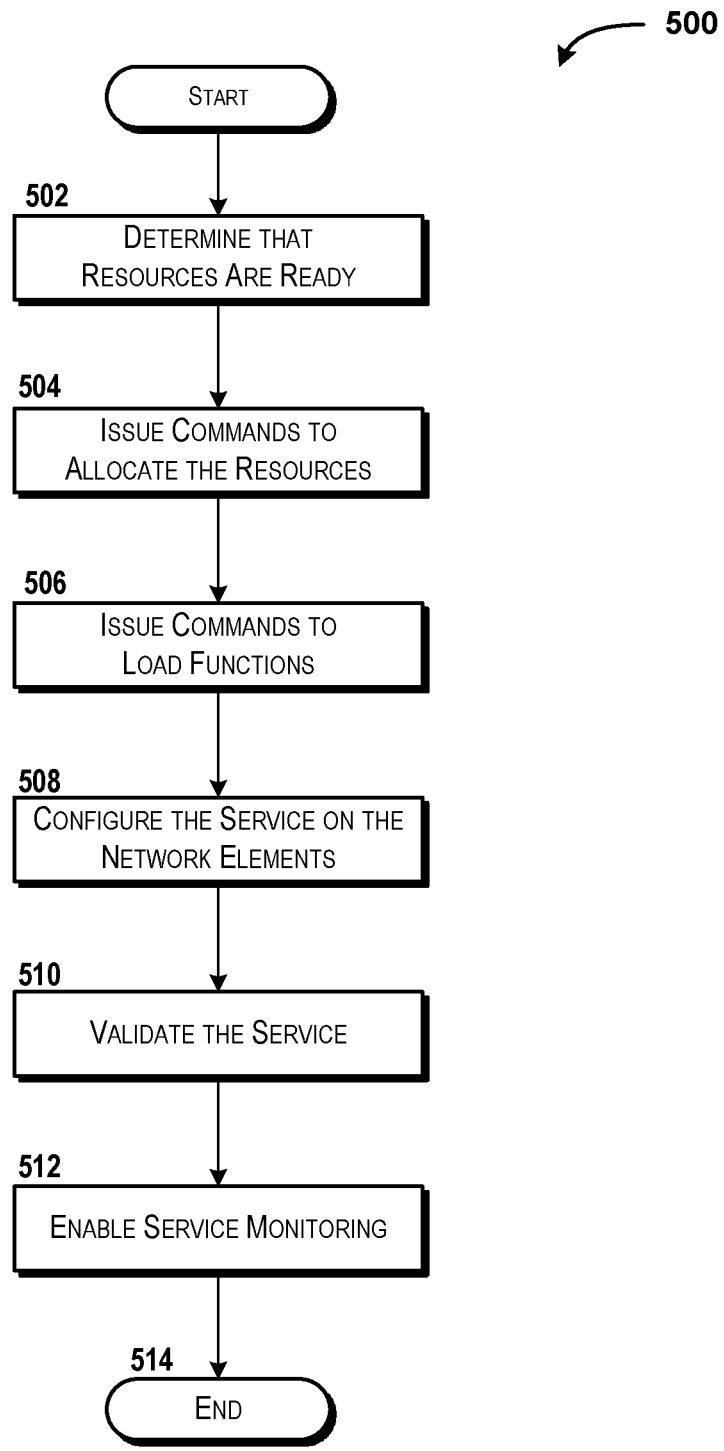
FIG. 5 is a flow diagram showing aspects of a method for managing deployment of a service, according to an illustrative embodiment of the concepts and technologies described herein.

Turning now to FIG. 5, aspects of a method 500 for managing deployment of a service will be described in detail, according to an illustrative embodiment. The method 500 begins at operation 502. At operation 502, the computing system 132 can determine that resources 124 associated with the service 130 are ready for the service 130. In some embodiments, the computing system 132 can determine that the resources 124 are ready by querying one or more network elements to determine if the resources 124 are ready.

For example, in some embodiments the service orchestrator can send a request that can be relayed to the network resource autonomous controller 202 to determine if the resources 124 are ready. The network resource autonomous controller 202 can configure the resources 124 in some instances and/or can communicate with other devices or entities to configure the resources. In some embodiments, the network resource autonomous controller 202 can communicate with the cloud orchestrator 116 to configure the resources 124. It should be understood that this example is illustrative and therefore should not be construed as being limiting in any way.

In particular, according to some embodiments, the network resource autonomous controller 202 can configure physical network functions itself. In some embodiments, the network resource autonomous controller 202 can employ assistance of the cloud orchestrator 116 to configure virtual network functions. Because the network functions can be configured in additional and/or alternative ways, it should be understood that this example is illustrative and therefore should not be construed as being limiting in any way.

The network resource autonomous controller 202 also can communicate with other entities associated with and/or in communication with the software defined network framework 110 to configure the resources 124. Regardless of what components and/or entities configure the resources 124, the network resource autonomous controller 202 and/or other components of the software defined network framework 110 and/or software defined network controller 114 can receive an indication that that one or more resources 124 are ready for the service 130 in operation 502.

From operation 502, the method 500 proceeds to operation 504. At operation 504, the computing system 132 can issue one or more commands 128 to allocate the resources 124. As explained above, the computing system 132 can correspond to a computing system that hosts the software defined network controller 114, the service orchestrator 112, and/or the cloud orchestrator 116.

The commands 128 can be issued to various entities and/or components of the software defined network framework 110 and/or entities in communication with the software defined network framework 110. Thus, it can be appreciated that in some embodiments, the software defined network controller 114 can issue the commands 128 to one or more of the service orchestrator 112 and the cloud orchestrator 116. As described above, the computing system 132 can issue commands 128 to configure and/or instantiate the resources 124 that will support the service 130. It should be understood that this example is illustrative and therefore should not be construed as being limiting in any way.

From operation 504, the method 500 proceeds to operation 506. At operation 506, the computing system 132 can issue one or more commands 128 to load the functions 126 to the resources 124. As explained above, the commands 128 can be issued to the cloud orchestrator 116 or other entity, which can configure the functions 126, and the functions 126 can be loaded to the resources 124. Upon completion of the operation 506, the service 130 can be instantiated and actively running on the network 104. It should be understood that this example is illustrative and therefore should not be construed as being limiting in any way.

From operation 506, the method 500 proceeds to operation 508. At operation 508, the computing system 132 can configure the service 130 on the network elements. Thus, for example, operation 508 can include the computing system 132 configuring the service 130 on one or more resources 124 and/or instructing other devices, applications, or other entities to configure the service 130. It should be understood that this example is illustrative and therefore should not be construed as being limiting in any way.

From operation 508, the method 500 proceeds to operation 510. At operation 510, the computing system 132 can validate the service 130. The computing system 132 can ensure that commands 128 for instantiating the service 130 have been completed and/or correctly implemented. Thus, operation 510 can include the computing system 132 ensuring that the service 130 has been activated and/or instantiated. It should be understood that this example is illustrative and therefore should not be construed as being limiting in any way.

From operation 510, the method 500 proceeds to operation 512. At operation 512, the computing system 132 can enable monitoring of the service 130. According to various embodiments, the concepts and technologies described herein can support monitoring of a service 130 to determine if and when the resources 124 associated with the service 130 should be changed. For example, extra resources 124 can be allocated to support the service 130 if demand for the service 130 rises above a level expected when the service 130 was instantiated. Similarly, resources 124 can be reallocated if demand for the service 130 fails to meet anticipated demand. Still further, the service 130 can be relocated based upon demand, if desired, so resources 124 and/or functions 126 can be reallocated, de-allocated, and/or relocated at various times. Thus, embodiments of the concepts and technologies described herein can support monitoring of the service 130 and/or the resources 124 to determine if resources 124 should be allocated, reallocated, moved, or otherwise changed. It should be understood that this example is illustrative and therefore should not be construed as being limiting in any way.

From operation 512, the method 500 proceeds to operation 514. The method 500 ends at operation 514. While the above description of FIG. 5 has provided a general overview of deploying a service, several example workflows are provided below to illustrate additional aspects of the concepts and technologies described herein.

Example Workflows

For purposes of illustrating and describing various aspects of the concepts and technologies described herein, some workflows are illustrated and described herein for communications between the software defined network controller 114, the service orchestrator 112, and the cloud orchestrator 116. While some aspects of these flows have been generally disclosed above, particularly with reference to FIG. 5, the examples described below provide examples of these interactions and provide additional details that can be used to further understand the concepts and technologies described herein. It should be understood that these examples are illustrative and therefore should not be construed as being limiting in any way.

Example One: VPN Service Creation

In a first example service request, a customer can request one or more virtual private network ("VPN") sites. The customer in this example can correspond to network operator, a process, a customer of a network provider, other entities, or the like. The service request can be received, for example, by a business support system ("BSS") or other device. The device can submit a request to the service orchestrator 112 for the one or more VPN sites for the customer associated with the service request.

The service orchestrator 112 can request the one or more VPN sites from a network service controller (e.g., the service control interpreter 210), in this case a VPN service controller. The network service controller (VPN service controller) can query or interrogate a network resource controller (e.g., the network resource autonomous controller 202) to determine if network resources used to provide VPN sites are available and/or ready.

The network resource controller can configure a set of physical network functions and virtual network functions to support the VPN service. In the case of a physical network function, the network resource controller can interrogate the wide area network ("WAN") and data center equipment (e.g., data center IPE) to configure the physical network functions. In the case of virtual network functions, the network resource controller can submit a request to the cloud orchestrator 116, which in turn can create one or more containers (e.g., processing resources, storage resources, etc.) for the functions. The request can include a location, policies, requirements, and the like.

The cloud orchestrator 116 can allocate processing and storage resources based upon the container policies and can load the functions 126 (in this case virtual network functions) to the containers. The cloud orchestrator 116 can inform the network resource controller that the virtual network function(s) is or are installed and ready.

The network resource controller can configure the virtual network functions and notify a cloud network controller to configure various equipment resources involved in the service such as in-path equipment, networking resources, switching resources (e.g., OVS), combinations thereof, or the like. In response, the cloud network controller can configure the equipment. The network resource controller can inform the network service controller that the configuration is complete and can start the VPN service requested. It should be understood that this example is illustrative and therefore should not be construed as being limiting in any way.

Example Two: VPN & CAAS Service Creation

In a second example service request, a customer can request one or more virtual private network ("VPN") sites. The service request can be received, for example, by a business support system ("BSS") or other device. The device can submit a request to the service orchestrator 112 for the one or more VPN sites for the customer associated with the service request.

The service orchestrator 112 can request the one or more VPN sites from a network service controller (e.g., the service control interpreter 210), in this case a VPN service controller that also supports CAAS environments. The network service controller (VPN service controller) can query or interrogate a network resource controller (e.g., the network resource autonomous controller 202) to determine if network resources used to provide VPN sites are available and/or ready.

The network resource controller can configure a set of physical network functions and virtual network functions to support the VPN service. In the case of a physical network function, the network resource controller can interrogate the wide area network ("WAN") and data center equipment (e.g., data center IPE) to configure the physical network functions. In the case of virtual network functions, the network resource controller can submit a request to the cloud orchestrator 116, which in turn can create one or more containers (e.g., processing resources, storage resources, etc.) for the functions. The request can include a location, policies, requirements, and the like.

The cloud orchestrator 116 can allocate processing and storage resources based upon the container policies and can load the functions 126 (in this case virtual network functions) to the containers. The cloud orchestrator 116 can inform the network resource controller that the virtual network function(s) is or are installed and ready.

The network resource controller can configure the virtual network functions and notify a cloud network controller to configure various equipment resources involved in the service such as in-path equipment, networking resources, switching resources (e.g., OVS), combinations thereof, or the like. In response, the cloud network controller can configure the equipment. The network resource controller can inform the network service controller that the configuration is complete and can start the VPN services requested.

It should be understood that this example is illustrative and therefore should not be construed as being limiting in any way.

Example Three: IMS Service Creation

In a third example service request, a request for an IMS service can be received. An IMS service orchestrator (e.g., the service orchestrator 112) can request that an IMS control function create an IMS configuration that meets at least minimum requirements. The IMS control function can request from an infrastructure cloud orchestrator (e.g., the cloud orchestrator 116) that the IMS configuration be created. The infrastructure cloud orchestrator can request that a cloud infrastructure create networking resources such as virtual LAN instances with assigned IP address ranges, DHCP, and the like.

The infrastructure cloud orchestrator can request from the cloud infrastructure that the cloud infrastructure create storage instances, and that the cloud infrastructure create virtual machine instances for each instance type (e.g., SBC, SCSF, HSS, etc.) that is attached to the storage and networking resources. The IMS control function can configure the virtual networking functions and the IMS service orchestrator can request that a WAN Network Service Orchestrator create a WAN network.

A WAN network service orchestrator (e.g., the service orchestrator 112) can request that a WAN network controller (e.g., the network resource autonomous controller 202) create a virtual WAN network between two geographic locations and assign IP addresses. The WAN network controller can create the WAN network using the IP addresses and instruct the networking equipment to attach the virtual WAN network to the local area network using the networking equipment. It should be understood that this example is illustrative and therefore should not be construed as being limiting in any way.

Example Four: Creation of an IP-Flex Reach Service from Existing Managed IP-PBX and Existing Managed Router In a fourth example service request, a request for an IP-Flex reach service from an existing managed IP-PBX and existing managed router can be received. An IP-Flex reach service orchestrator can request, from a TN assignment entity, that TNs be assigned for a customer. The IP-Flex reach service orchestrator can request that a BVoIP control function create a customer instance and tie the customer instance to the platform.

The BVoIP control function can request that an infrastructure cloud orchestrator create a BVoIP customer instance configuration. To accomplish this, the infrastructure cloud orchestrator can request a cloud infrastructure to create virtual LAN instances with assigned IP address ranges, DHCP, and the like; and the infrastructure cloud orchestrator can also request the cloud infrastructure to create storage instances, virtual machine instances for each instance type [AS, SBC] attached to storage, networking, and the like.

The IP-Flex reach service orchestrator can instruct the BVoIP controller to configure LAN, AS, TF/BGCF, SBC, GSX with TN's, CPE, and IP addresses. The IP-Flex reach service orchestrator can instruct a VPN service orchestrator to create WAN (VPN) linking BVoIP to a customer router. The VPN service orchestrator can instruct a WAN service/network controller to create WAN (VPN) from LAN to the customer router. The WAN service/network controller can instruct the WAN network to create a WAN, the WAN service/network controller can instruct the IPE to link the WAN to the LAN, and the WAN service/network controller can instruct the WAN network to link the WAN to the customer router.

The IP-Flex reach service orchestrator can instruct a managed CPE service/network controller to configure/connect a customer CPE to BVoIP via the WAN Network. The managed CPE service/network controller can instruct the customer router to attach to the WAN. The managed CPE service/network controller can instruct the customer IP-PBX to configure numbers, SBC, routing, and the like. It should be understood that this example is illustrative and therefore should not be construed as being limiting in any way.

Figure 6:
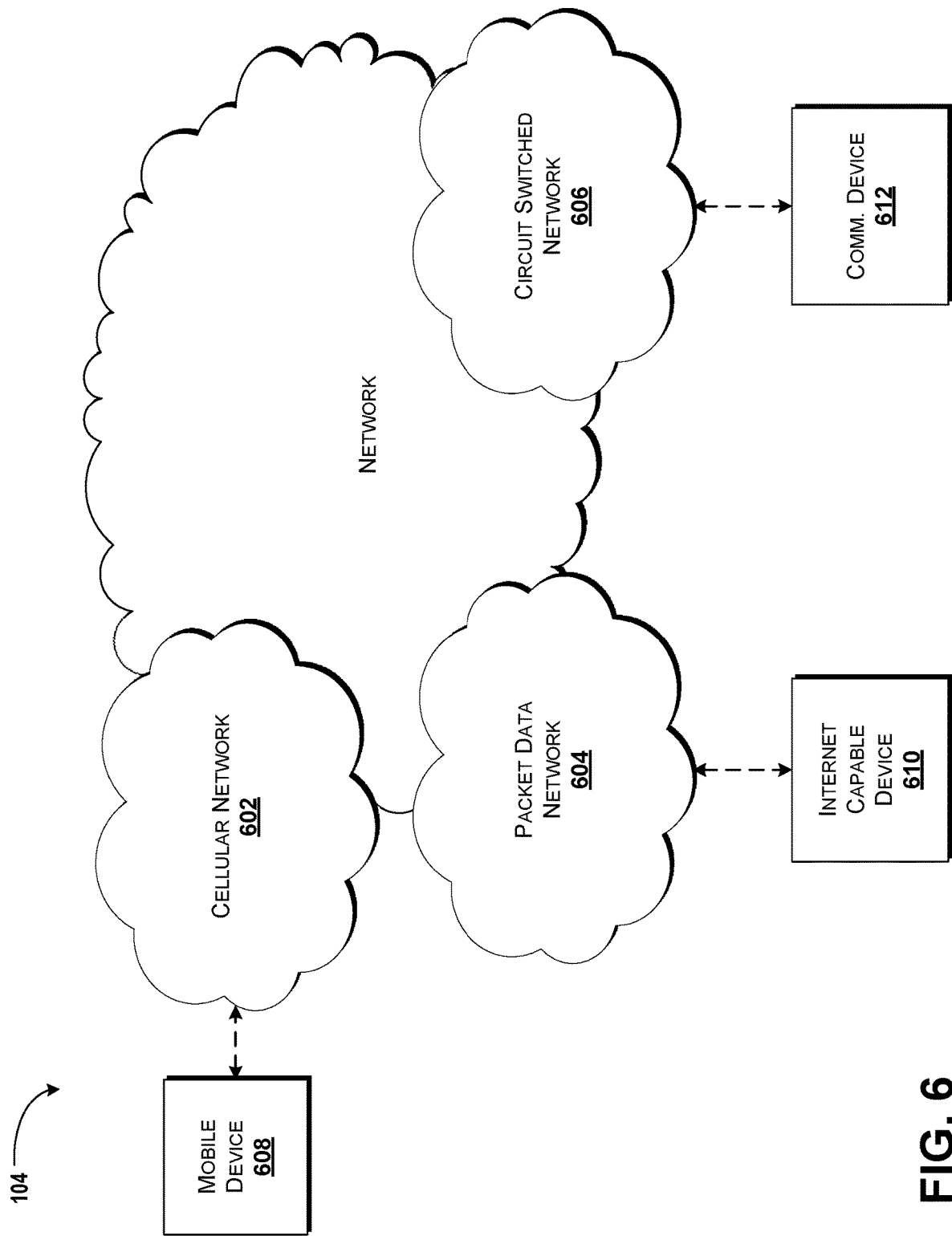
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
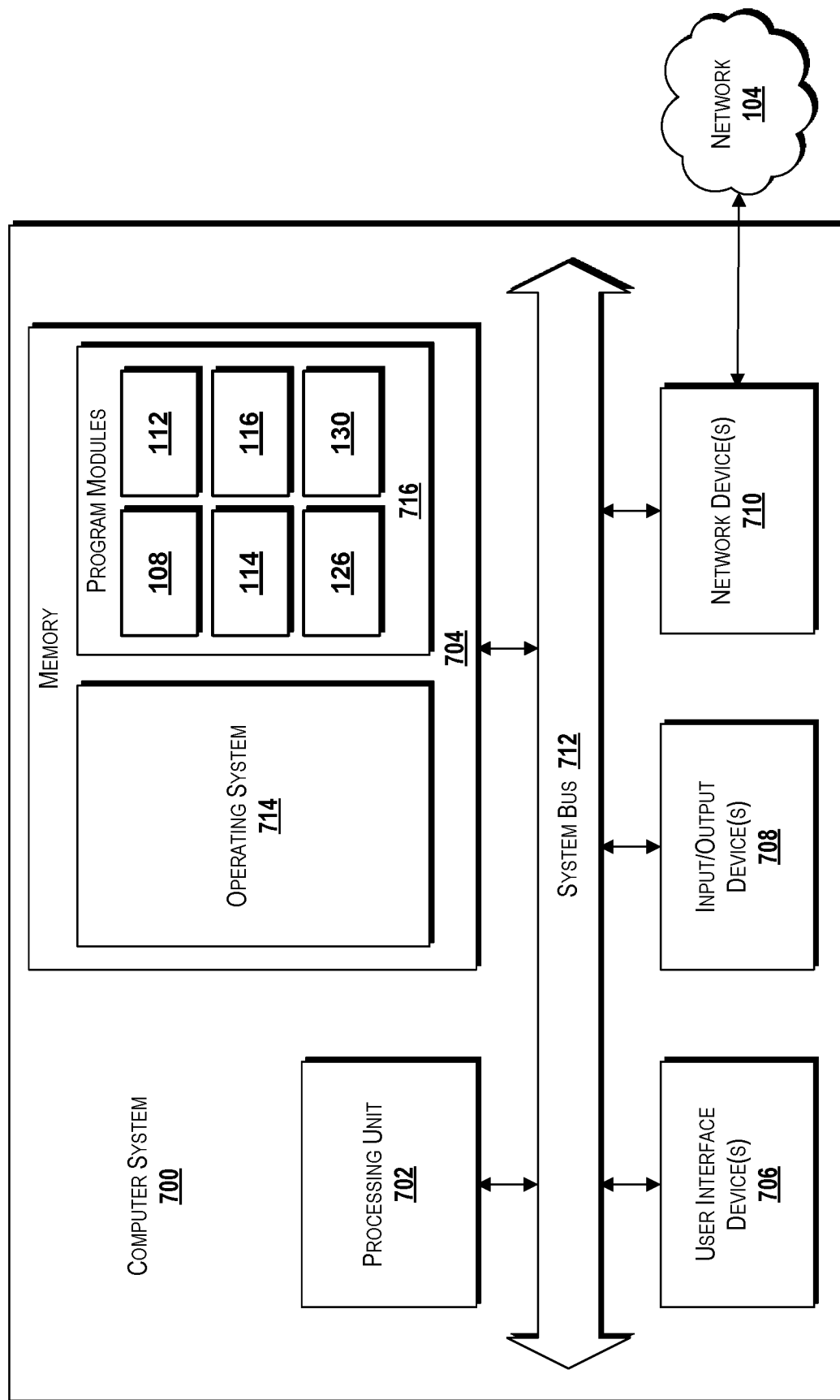
FIG. 7 is a block diagram illustrating an example computer system configured to provide and/or interact with a software defined network controller, according to some illustrative embodiments of the concepts and technologies described herein.

FIG. 7 is a block diagram illustrating a computer system 700 configured to provide the functionality described herein for providing and interacting with a software defined network controller, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the application programs 108, the service orchestrator 112, software defined network controller 114, the cloud orchestrator 116, the functions 126, the service 130, the network resource autonomous controller 202, the network DCAE 204, the service control interpreter 210, and the compilers 212. These and/or other programs can be embodied in computer-readable media containing instructions that, when executed by the processing unit 702, perform one or more of the methods 300, 400, 500 described in detail above with respect to FIGS. 3-5. According to embodiments, the program modules 716 may be embodied in hardware, software, firmware, or any combination thereof. Although not shown in FIG. 7, it should be understood that the memory 704 also can be configured to store the service feature data 122, the service data 118, the commands 128, the templates 206, the model files 214, the directed graphs 216, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing and using a software defined network controller have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method for operating a software-defined networking system, the method comprising:
   receiving, at a service orchestrator, a service request to instantiate a virtual network service;
   requesting, by the service orchestrator, a network service controller to determine whether one or more network resources are available to provide the virtual network service;
   querying, by the network service controller, a network resource controller to determine whether the one or more network resources are available to provide the virtual network service;
   in response to determining, by the network resource controller, that the one or more network resources are available to provide the virtual network service:
   configuring, by the network resource controller, a set of physical or virtual network functions to provide the virtual network service;
   initiating, by the network resource controller, allocation of one or more physical network resources associated with the physical or virtual network functions; and
   signaling the service orchestrator that the virtual network service is ready for instantiation; and
   instructing, by the service orchestrator, instantiation of the virtual network service.

2. The method of claim 1, wherein the virtual network service is a virtual private network service.

3. The method of claim 1, wherein the service request generates one or more of a service model or a network model.

4. The method of claim 1, wherein one or more of the network service controller or the service orchestrator is configured to obtain a service model associated with the virtual network service and a network model associated with the virtual network service upon receiving the service request.

5. The method of claim 4, wherein the service orchestrator is configured to:
   obtain the service model and the network model; and
   transmit the service model and the network model to the network service controller.

6. The method of claim 4, wherein the service model is stored in a file formatted according to a modelling language, a protocol, or a script.

7. The method of claim 4, wherein one or more of the network service controller or the service orchestrator is configured to obtain a directed graph based at least on the service model.

8. The method of claim 7, wherein at least one operation of the network service controller or the service orchestrator uses the directed graph when processing the network model or the service model to instantiate the virtual network service.

9. The method of claim 1, wherein the one or more physical network resources comprises a processing resource or storage resource.

10. A method of operating a software-defined networking system, the method comprising:
    receiving a request to provide a virtual network service;
    selecting a network controller from among multiple network controllers, wherein the selected network controller is configured to determine whether a network resource is available to provide the virtual network service; and
    in response to the selected network controller determining that the network resource is available:
    configuring a set of network functions to provide the virtual network service, the set of network functions associated with the network resource;
    allocating the network resource; and
    instantiating the virtual network service.

11. The method of claim 10, wherein the request generates one or more of a service model or a network model.

12. The method of claim 11, wherein the network controller is configured to obtain a directed graph based at least on the one or more of the service model or the network model.

13. The method of claim 12, wherein the network controller comprises a network service controller and a network resource controller.

14. The method of claim 10, wherein:
the network resource is at least one selected from a group of a physical resource or a virtual resource; and
the group of the physical resource or the virtual resource comprises a processor or a memory.

\* \* \* \* \*